(12) United States Patent
Gustin et al.

(10) Patent No.: US 7,688,818 B2
(45) Date of Patent: Mar. 30, 2010

(54) APPARATUS AND METHOD FOR TRAFFIC FILTERING IN A COMMUNICATION SYSTEM

(75) Inventors: Jay W. Gustin, Scottsdale, AZ (US); Shannon J. Scott, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1027 days.

(21) Appl. No.: 11/316,252

(22) Filed: Dec. 20, 2005

(65) Prior Publication Data

US 2007/0140237 A1 Jun. 21, 2007

(51) Int. Cl.
*H04L 12/28* (2006.01)
(52) U.S. Cl. .................. 370/389; 370/235; 370/386; 370/392; 370/400; 709/220; 709/221; 709/223; 709/249
(58) Field of Classification Search .......... 370/252, 370/254, 389, 395.52, 395.53, 401, 402, 370/235, 386, 392, 400, 412, 413, 418; 709/220, 709/221, 223, 224, 249; 714/47, 48
See application file for complete search history.

(56) References Cited

U.S. PATENT DOCUMENTS

| | | | | |
|---|---|---|---|---|
| 5,394,402 | A * | 2/1995 | Ross | 370/402 |
| 5,617,421 | A * | 4/1997 | Chin et al. | 370/402 |
| 5,963,556 | A * | 10/1999 | Varghese et al. | 370/401 |
| 6,195,351 | B1 | 2/2001 | Hiscock et al. | |
| 6,216,167 | B1 * | 4/2001 | Momirov | 709/238 |
| 6,249,883 | B1 | 6/2001 | Cassidy et al. | |
| 6,308,282 | B1 | 10/2001 | Huang et al. | |
| 6,356,553 | B1 | 3/2002 | Nagami et al. | |
| 6,430,621 | B1 * | 8/2002 | Srikanth et al. | 709/238 |
| 6,526,052 | B1 * | 2/2003 | Rijhsinghani et al. | 370/389 |
| 6,556,575 | B1 | 4/2003 | Denio et al. | |

(Continued)

FOREIGN PATENT DOCUMENTS

CA 2 433 576 7/2002

(Continued)

OTHER PUBLICATIONS

U.S. Appl. No. 11/170,202, filed Jun. 29, 2005, Michael L. Baker et al., "Apparatus and Method for Segmenting a Communication Network.".

(Continued)

*Primary Examiner*—Salman Ahmed
*Assistant Examiner*—Andrew C Lee
(74) *Attorney, Agent, or Firm*—Munck Carter, LLP (57) ABSTRACT

A method includes receiving traffic through a first interface in a first group of interfaces at a switch. The first group of interfaces is associated with a first virtual network. The method also includes determining that the traffic is destined for a destination associated with a second virtual network and forwarding the traffic to a second interface in a second group of interfaces at the switch. The second group of interfaces is associated with the second virtual network. The method further includes filtering the traffic that is received at the second interface in the second group of interfaces and communicating the filtered traffic towards the destination. The first and second virtual networks could represent Virtual Local Area Networks associated with different network levels of a process control system.

17 Claims, 3 Drawing Sheets

U.S. PATENT DOCUMENTS

| | | | |
|---|---|---|---|
| 6,560,236 B1 | 5/2003 | Varghese et al. | |
| 6,563,832 B1* | 5/2003 | Stuart et al. | 370/403 |
| 6,690,668 B1* | 2/2004 | Szczepanek et al. | 370/392 |
| 6,718,379 B1* | 4/2004 | Krishna et al. | 709/223 |
| 6,728,780 B1* | 4/2004 | Hebert | 709/239 |
| 6,735,198 B1* | 5/2004 | Edsall et al. | 370/389 |
| 6,798,775 B1* | 9/2004 | Bordonaro et al. | 370/392 |
| 6,807,176 B1* | 10/2004 | Egbert et al. | 370/392 |
| 7,089,345 B1* | 8/2006 | Lynn | 710/316 |
| 7,099,336 B2 | 8/2006 | Kalkunte et al. | |
| 7,170,895 B2* | 1/2007 | Wirth et al. | 370/400 |
| 7,218,639 B2* | 5/2007 | Matsufuru | 370/412 |
| 7,313,613 B1* | 12/2007 | Brooking et al. | 709/223 |
| 7,460,542 B2* | 12/2008 | Bhatia | 370/395.31 |
| 7,483,374 B2* | 1/2009 | Nilakantan et al. | 370/235 |
| 2002/0027908 A1* | 3/2002 | Kalkunte et al. | 370/389 |
| 2002/0046357 A1 | 4/2002 | Huang et al. | |
| 2002/0167902 A1* | 11/2002 | Foster et al. | 370/230 |
| 2003/0081625 A1* | 5/2003 | Matsufuru | 370/412 |
| 2003/0165140 A1 | 9/2003 | Tang et al. | |
| 2003/0223378 A1* | 12/2003 | Ishwar et al. | 370/254 |
| 2004/0210623 A1* | 10/2004 | Hydrie et al. | 709/201 |
| 2005/0138149 A1* | 6/2005 | Bhatia | 709/220 |
| 2005/0138432 A1 | 6/2005 | Ransom et al. | |
| 2005/0271065 A1* | 12/2005 | Gallatin et al. | 370/401 |
| 2007/0078667 A1* | 4/2007 | Chand et al. | 705/1 |
| 2007/0110078 A1* | 5/2007 | De Silva et al. | 370/395.53 |
| 2009/0046734 A1* | 2/2009 | Cheriton et al. | 370/412 |

FOREIGN PATENT DOCUMENTS

| | | |
|---|---|---|
| WO | WO 00/79758 A2 | 12/2000 |
| WO | WO 03/073283 A1 | 9/2003 |

OTHER PUBLICATIONS

Sejun Song, "Fault Recovery Port-based Fast Spanning Tree Algorithm (FRP-FAST) for the Fault-Tolerant Ethernet on the Arbitrary Switched Network Topology", 2001 IEEE, pp. 325-332.

S. Song, et al., "Fault-Tolerant Ethernet Middleware for IP-Based Process Control Networks", 2000 IEEE, pp. 116-125.

* cited by examiner

APPARATUS AND METHOD FOR TRAFFIC FILTERING IN A COMMUNICATION SYSTEM

TECHNICAL FIELD

This disclosure relates generally to communication systems and more specifically to an apparatus and method for traffic filtering in a communication system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In some process control systems, components are divided into a hierarchy of levels, referred to as "network levels." Components in different network levels are typically responsible for performing different types of functions in the process control systems. For example, a conventional process control system could include one or more Level 1 network levels and one or more Level 2 network levels. As particular examples, a Level 1 network level may include controllers and other components used to control the industrial equipment. A Level 2 network level may include servers, personal computers, and other components used to interact with and control the components in the Level 1 network level.

It is often important to protect more critical components of the process control systems (such as components in Level 1 network levels) from virus attacks or other disruptions. One prior approach involves providing separate switches for the more critical components and for the less critical components of the process control system. However, this approach often increases the complexity and cost of the process control system because multiple sets of switches are required.

SUMMARY

This disclosure provides an apparatus and method for traffic filtering in a communication system.

In a first embodiment, a method includes receiving traffic through a first interface in a first group of interfaces at a switch. The first group of interfaces is associated with a first virtual network. The method also includes determining that the traffic is destined for a destination associated with a second virtual network. The method further includes forwarding the traffic to a second interface in a second group of interfaces at the switch. The second group of interfaces is associated with the second virtual network. Moreover, the method includes filtering the traffic that is received at the second interface in the second group of interfaces. In addition, the method includes communicating the filtered traffic towards the destination.

In particular embodiments, the first and second virtual networks represent Virtual Local Area Networks associated with different network levels of a process control system. At least one of the network levels includes one or more controllers capable of controlling one or more process elements in a processing facility.

In other particular embodiments, forwarding the traffic to the second interface includes forwarding the traffic to a third interface in the first group of interfaces. The third interface is coupled to the second interface by a cable. The cable could represent a crossover cable.

In a second embodiment, an apparatus includes a plurality of interfaces, including a first group of interfaces associated with a first virtual network and a second group of interfaces associated with a second virtual network. The apparatus also includes a switch fabric capable of transporting traffic between the interfaces. The apparatus further includes a controller capable of determining that traffic received through a first interface in the first group of interfaces is destined for a destination associated with the second virtual network. The controller is also capable of causing the switch fabric to forward the traffic to a second interface in the second group of interfaces. The controller is further capable of filtering the traffic that is received at the second interface in the second group of interfaces. In addition, the controller is capable of causing the switch fabric to forward the filtered traffic to a third interface in the second group of interfaces for communication of the filtered traffic towards the destination.

In a third embodiment, a system includes a plurality of switches capable of facilitating communication between a plurality of endpoints. At least one of the switches includes a plurality of interfaces, including a first group of interfaces associated with a first virtual network and a second group of interfaces associated with a second virtual network. At least one of the switches also includes a switch fabric capable of transporting traffic between the interfaces. At least one of the switches further includes a controller capable of determining that traffic received through a first interface in the first group of interfaces is destined for an endpoint associated with the second virtual network. The controller is also capable of causing the switch fabric to forward the traffic to a second interface in the second group of interfaces. The controller is further capable of filtering the traffic that is received at the second interface in the second group of interfaces. In addition, the controller is capable of causing the switch fabric to forward the filtered traffic to a third interface in the second group of interfaces for communication of the filtered traffic towards the endpoint associated with the second virtual network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
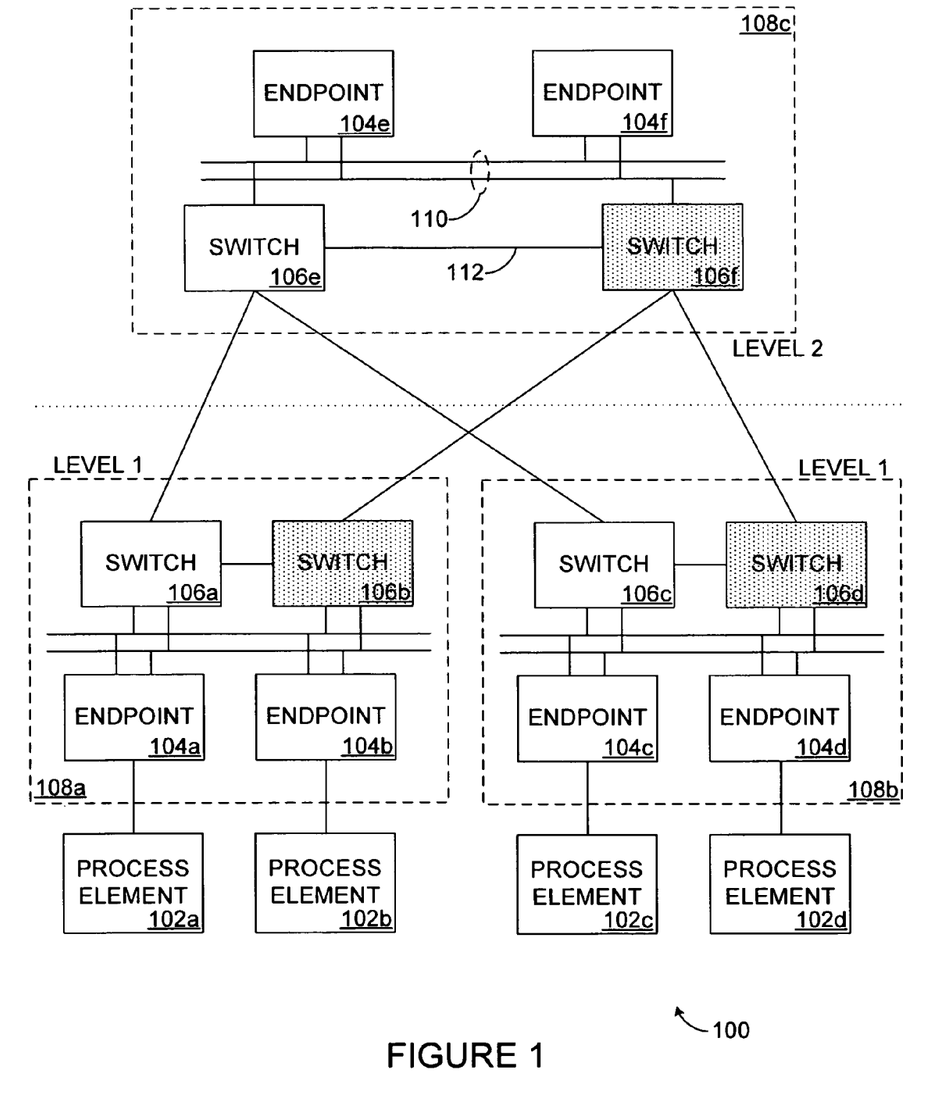
FIG. 1 illustrates an example communication system according to one embodiment of this disclosure.

FIG. 1 illustrates an example communication system 100 according to one embodiment of this disclosure. The embodiment of the communication system 100 shown in FIG. 1 is for illustration only. Other embodiments of the communication system 100 may be used without departing from the scope of this disclosure.

In this example embodiment, the communication system 100 represents a process control system that includes process elements 102a-102d, endpoints 104a-104f, and switches 106a-106f. The process elements 102a-102d represent components in a processing environment that perform any of a wide variety of functions. For example, the process elements 102a-102d could represent motors, valves, and other industrial equipment in a processing environment. The process elements 102a-102d could represent any other or additional components in a processing environment. Each of the process elements 102a-102d includes any hardware, software, firmware, or combination thereof for performing one or more functions in a processing environment. The process elements 102a-102d could, for example, represent any component, device, or system capable of manipulating, altering, or otherwise processing one or more materials in a processing environment.

The endpoints 104a-104f represent components in the communication system 100 that are capable of controlling the operation of the process elements 102a-102d. For example, the endpoints 104a-104d may be capable of directly interacting with and controlling the operation of the process elements 102a-102d. The endpoints 104e-104f may be capable of controlling the operation of the process elements 102a-102d indirectly through the endpoints 104a-104d. Each of the endpoints 104a-104f includes any hardware, software, firmware, or combination thereof for controlling one or more operations in the communication system 100. As particular examples, the endpoints 104a-104d could include or represent embedded controllers such as C200, C300, or C400 controllers from HONEYWELL INTERNATIONAL INC. or Fieldbus interface modules (FIMs). The endpoints 104e-104f could include or represent servers such as PROCESS KNOWLEDGE SYSTEM (PKS) servers from HONEYWELL INTERNATIONAL INC. or ADVANCED CONTROL ENVIRONMENT (ACE) servers from HONEYWELL INTERNATIONAL INC. The endpoints 104e-104f could also include or represent operator stations such as desktop computers, laptop computers, or personal digital assistants.

The switches 106a-106f transport information between various ones of the endpoints 104a-104f. For example, the switch 106a may receive information from the endpoint 104a and transmit the information to the endpoint 104e via the switch 106e. Depending on the layout of the system 100, each of the switches 106a-106f is typically coupled to one or more of the endpoints 104a-104f and/or one or more other switches. Each of the switches 106a-106f includes any hardware, software, firmware, or combination thereof for transporting information in the system 100. The switches 106a-106f could, for example, represent 2950 SERIES switches from CISCO SYSTEMS, INC.

Depending on the function of the endpoints 104a-104f, the endpoints 104a-104f may communicate any suitable information through the switches 106a-106f. The information transported between components in a system is generally referred to as "traffic." In some embodiments, part of the traffic sent to the endpoints 104a-104d from the endpoints 104e-104f represents control information for controlling the operation of the endpoints 104a-104d. In this way, the endpoints 104e-104f may generally control how the endpoints 104a-104d control the operation of the process elements 102a-102d. Also, the endpoints 104a-104f may use any suitable protocol or protocols for communicating information, such as by using Transmission Control Protocol/Internet Protocol (TCP/IP) or User Datagram Protocol/Internet Protocol (UDP/IP) over Ethernet. In addition, each of the endpoints 104a-104f could be fixed in a specific location or be mobile, and the endpoints 104a-104f could communicate with the switches 106a-106f over wired or wireless connections.

As shown in FIG. 1, the communication system 100 is divided into a hierarchy of network levels 108a-108c, including Level 1 network levels 104a-104b and a Level 2 network level 108c. In this example, each of the network levels 108a-108c includes one or more of the endpoints 104a-104f and one or more of the switches 106a-106f. In particular embodiments, the components in a Level 1 network level could reside in a single cabinet or other structure. The communication system 100 could include additional network levels, such as levels denoted "Level 3" (containing non-critical control applications) and "Level 4" (containing plant-wide or facility-wide applications).

In some embodiments, the communication system 100 represents a redundant or fault tolerant network. For example, the communication system 100 could represent a Fault Tolerant Ethernet (FTE) network. An FTE network typically includes two networks that are generally independent of one another, where multiple redundant paths exist between any two of the endpoints 104a-104f. As shown in FIG. 1, the switches 106a-106f operate in pairs, and each pair of switches 106a-106f includes an unshaded switch and a shaded switch. The shading distinguishes the different, generally independent networks. Among other aspects, the redundant networks may be associated with different diagnostic messages, which are periodically broadcast or multicast to indicate that components are operating and which are used to route traffic and avoid faults in the system 100.

In these types of networks, each of the endpoints 104a-104f may be coupled to a pair of the switches 106a-106f via a redundant network 110 (such as two Ethernet networks). In the event that one switch in a pair is lost in the system 100, the other switch in the pair is used to route traffic. This helps to ensure that the endpoints 104a-104f may continue operating normally even when a switch becomes inoperative. Also, switches in each pair are coupled to one another via a crossover cable 112. The crossover cables 112 may represent the only interconnections between the two redundant networks. Among other things, these features help to ensure that at least four redundant paths exist between any two of the endpoints 104a-104f.

In one aspect of operation, the switches 106a-106f in the system 100 include at least one "split switch." A split switch represents a single physical switch that functions as multiple switches. In these embodiments, a split switch may be coupled to both a Level 1 network level and a Level 2 network level. In some embodiments, the split switch supports a Virtual Local Area Network (VLAN) or other virtual network for the Level 1 network level and a separate VLAN or other virtual network for the Level 2 network level. In particular embodiments, the split switch creates a VLAN for the Level 1 network level and uses an FTE community VLAN for the Level 2 network level. Among other things, this allows the split switch to maintain a separation between the traffic in the Level 1 network level and the traffic in the Level 2 network level. A cable is used to connect the VLANs, and the split switch uses this cable to transport traffic between the VLANs.

The split switch is also configured to provide traffic filtering at an ingress to the Level 1 VLAN. For example, the split switch could use one or more access lists to allow traffic for specific TCP or UDP ports to pass into the Level 1 VLAN. The access lists could also allow additional traffic to pass that is needed to maintain the system 100, such as Address Resolution Protocol (ARP) broadcast traffic, multicast test messages, and Network Timing Protocol (NTP) traffic. All other traffic could be blocked and prevented from entering into the Level 1 VLAN. In particular embodiments, the access lists in the split switch are customizable or variable, depending on the type of traffic required by the components in the Level 1 network level.

By using the virtual networks and the filtering function, the split switch is virtually divided into two switches (one for the Level 1 network level and another for the Level 2 network level), where traffic filtering is provided for at least one of the virtual switches. In this way, the split switch may effectively protect the components in the Level 1 network level from disruption while still allowing control and other necessary traffic into the Level 1 network level. Also, the split switch may provide this protection without requiring the use of multiple physical switches, which may help to reduce the complexity and cost of the system 100. Additional details about a split switch are shown in FIG. 2, which is described below.

Although FIG. 1 illustrates one example of a communication system 100, various changes may be made to FIG. 1. For example, a communication system could include any number of process elements, endpoints, switches, and network levels. Also, FIG. 1 illustrates one operational environment in which a split switch can be used to provide traffic filtering. The split switch could be used in any other suitable process control or non-process control device or system.

Figure 2:
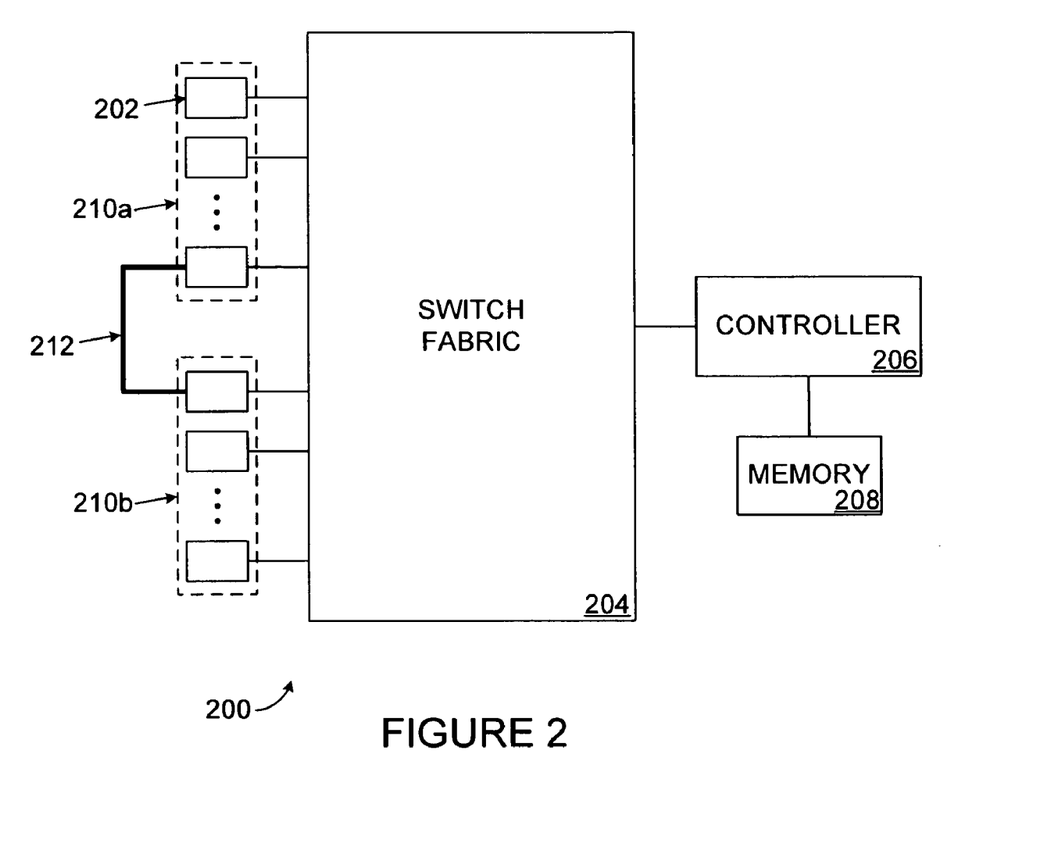
FIG. 2 illustrates an example switch for traffic filtering in a communication system according to one embodiment of this disclosure.

FIG. 2 illustrates an example switch 200 for traffic filtering in a communication system according to one embodiment of this disclosure. The switch 200 in FIG. 2 could, for example, represent any of the switches 106*a*-106*f* shown in FIG. 1. The switch 200 could also be used in any other suitable system. Also, the embodiment of the switch 200 shown in FIG. 2 is for illustration only. Other embodiments of the switch 200 could be used without departing from the scope of this disclosure.

In this example, the switch 200 includes multiple interfaces 202, a switch fabric 204, a controller 206, and a memory 208. The interfaces 202 facilitate communication between the switch 200 and various external components. For example, the interfaces 202 may be coupled to one or more endpoints and/or one or more other switches via network cables. The interfaces 202 represent any suitable structure or structures for facilitating communication with external components, such as RJ-45 jacks capable of receiving Ethernet cables.

The switch fabric 204 facilitates the transfer of information between various external components coupled to the switch 200. For example, the switch fabric 204 could transport information between various ones of the interfaces 202. In this way, the switch fabric 204 may receive information through one interface 202 and provide that information for communication through one or more other interfaces 202. The switch fabric 204 includes any suitable structure or structures for transporting information between interfaces 202.

The controller 206 is coupled to the switch fabric 204. The controller 206 controls the overall operation of the switch 200. For example, the controller 206 could control the switch fabric 204, thereby controlling the routing of information between the interfaces 202. The controller 206 could also perform various operations to support the creation or use of multiple VLANs or other virtual networks. The controller 206 could further perform various operations to support traffic filtering to block or pass traffic to or from one or more of the virtual networks. In addition, the controller 206 could perform other functions, including multicast policing and enforcing broadcast storm limits (such as by using or enforcing 1 mbit/sec limits). The controller 206 includes any hardware, software, firmware, or combination thereof for controlling the switch 200.

The memory 208 is coupled to the controller 206. The memory 208 stores and facilitates retrieval of information used by the controller 206 to control the operation of the switch 200. For example, the memory 208 could store one or more control programs executed by the controller 206. The memory 208 could also store one or more access lists, which are used by the controller 206 to provide traffic filtering. The memory 208 could further store one or more spanning trees, which are used to route information in the communication system 100. In addition, the memory 208 could store information used to support the use of multiple virtual networks. The memory 208 includes any suitable volatile and/or non-volatile storage and retrieval device or devices, such as random access memory (RAM), read-only memory (ROM), flash memory, or any other or additional type of memory.

As shown in FIG. 2, the interfaces 202 are divided into two groups or subsets 210*a*-210*b*. Each of the subsets 210*a*-210*b* includes at least two of the interfaces 202. In this example, each of the subsets 210*a*-210*b* is coupled to a different network level in a communication system. For example, the subset 210*a* of interfaces 202 could be coupled to a Level 1 network level, and the subset 210*b* of interfaces 202 could be coupled to a Level 2 network level. In this example, the subsets 210*a*-210*b* of interfaces 202 are also associated with different VLANs or other virtual networks. As an example, the subset 210*a* of interfaces 202 could be associated with a VLAN used in a Level 1 network level, and the subset 210*b* of interfaces 202 could be associated with an FTE community VLAN in a Level 2 network level. In addition, the different virtual networks are connected via a cable 212, which couples one interface 202 in subset 210*a* and one interface 202 in subset 210*b*. The cable 212 represents any suitable connection, such as a crossover Ethernet cable.

In these embodiments, the switch 200 supports the use of multiple virtual networks and segregates the virtual networks' traffic. For example, the switch 200 may route traffic from one interface 202 of a subset only to another interface 202 in that same subset. In this way, traffic within a virtual network typically stays within the virtual network, unless the traffic is sent over the cable 212 to an interface 202 associated with another virtual network. Also, the switch 200 supports traffic filtering for at least one of the virtual networks. As an example, if subset 210*a* is associated with a Level 1 network level and subset 210*b* is associated with a Level 2 network level, the controller 206 could perform traffic filtering for any traffic entering the interface 202 coupled to the cable 212 in subset 210*a*. In this way, the switch 200 provides traffic filtering for the Level 1 network level, which may help to protect the components of the Level 1 network level from disruptions caused by viruses or other sources.

In particular embodiments, the switch 200 includes twenty-four interfaces 202. The first two interfaces 202 may represent uplinks into a Level 2 network level. The next ten interfaces 202 may represent links into a Level 1 network level. The following two interfaces 202 may represent the interfaces 202 that are coupled using the cable 212. The last ten interfaces 202 may represent links into the Level 2 network level. Also, other interfaces could be supported in the switch 200, such as when multiple Gigabit Interface Converter (GBIC) uplinks to the Level 2 network level are supported. In addition, the spanning tree in the switch 200 could be configured to prevent the blocking of traffic between the subsets 210*a*-210*b* of interfaces 202.

Although FIG. 2 illustrates one example of a switch 200 for traffic filtering in a communication system, various changes may be made to FIG. 2. For example, the switch 200 could include any suitable number of interfaces 202, switch fabrics 204, controllers 206, and memories 208. Also, the switch 200 is shown as including two subsets 210*a*-210*b* of interfaces 202 and is described as being coupled to two network levels and supporting two virtual networks. The switch 200 could include any suitable number of interface subsets, be coupled to any suitable number of network levels, and support any suitable number of virtual networks. If more than two virtual networks are used, multiple cables 212 could be used with the switch 200, one cable 212 coupling each pair of virtual networks.

Figure 3:
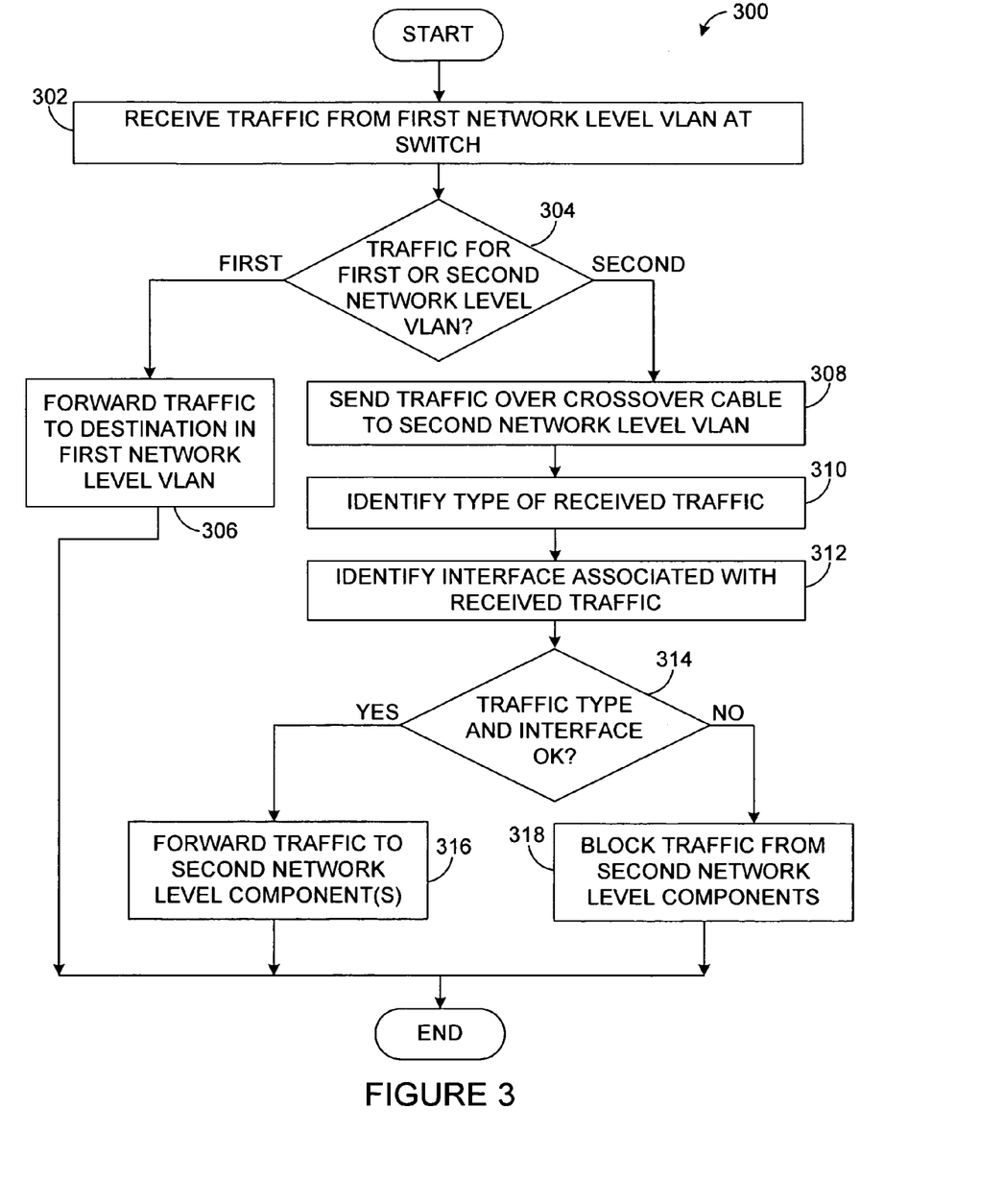
FIG. 3 illustrates an example method for traffic filtering in a communication system according to one embodiment of this disclosure.

FIG. 3 illustrates an example method 300 for traffic filtering in a communication system according to one embodiment of this disclosure. For ease of explanation, the method 300 of FIG. 3 is described with respect to the switch 200 of FIG. 2 operating in the system 100 of FIG. 1. The method 300 could be used by any other suitable device and in any other suitable system.

The switch 200 receives traffic from a first network level VLAN at step 302. This may include, for example, the switch 200 receiving traffic from a component in a Level 2 network level via a first interface 202 in a subset 210b associated with the Level 2 network level. The traffic may be destined for a component in the first network level VLAN or in a second network level VLAN.

The switch 200 determines whether the traffic is destined for a component in the first network level VLAN or the second network level VLAN at step 304. This may include, for example, the controller 206 examining a destination address associated with the received traffic. This may also include the controller 206 determining if the identified destination address is associated with a component in the first network level VLAN.

If the traffic is destined for a component in the first network level VLAN, the switch 200 forwards the received traffic to the component in the first network level VLAN at step 306. This may include, for example, the switch fabric 204 sending the traffic received over the first interface 202 in the subset 210b to a second interface 202 in the same subset 210b. This may also include the switch 200 forwarding the received traffic towards the destination component via the second interface 202 in the subset 210b.

If the traffic is destined for a component in the second network level VLAN, the switch 200 sends the received traffic over the crossover cable 212 to the second network level VLAN at step 308. This may include, for example, the switch fabric 204 sending the traffic from a second interface 202 in subset 210b to a first interface 202 in subset 210a. The subset 210a could be associated with a Level 1 network level.

The switch 200 identifies the type of received traffic at step 310 and an interface associated with the received traffic at step 312. This may include, for example, the controller 206 determining if the received traffic represents unicast traffic, broadcast traffic, multicast traffic, or NTP traffic. This may also include the controller 206 identifying a TCP or UDP port within the source or destination address of the received traffic.

The switch 200 performs traffic filtering and determines if the identified traffic type and interface are acceptable at step 314. This may include, for example, the controller 206 determining if the identified traffic type represents ARP broadcast traffic, multicast test messages, or NTP traffic. This may also include the controller 206 determining if the identified traffic type represents unicast traffic and the identified TCP or UDP port falls within a range of acceptable ports.

If the identified traffic type and interface are acceptable, the switch 200 forwards the traffic to one or more components in the second network level VLAN at step 316. This may include, for example, the switch fabric 204 sending the traffic from the first interface 202 in the subset 210a to one or more second interfaces 202 in the subset 210a. Otherwise, if the identified traffic-type or interface is not acceptable, the switch 200 blocks the traffic from the second network level VLAN at step 318. This may include, for example, the switch 200 failing to forward the traffic to any components in the second network level VLAN and removing the traffic from any internal buffers.

Although FIG. 3 illustrates one example of a method 300 for traffic filtering in a communication system, various changes may be made to FIG. 3. For example, FIG. 3 illustrates that the traffic type and interface for the received traffic are both determined. In other embodiments, only one of these could be determined, such as when the traffic type indicates that the data will or will not be forwarded (no matter what the interface is). Also, while shown as a series of steps, various steps in FIG. 3 could occur in parallel or in a different order. In addition, while shown as using VLANs, the method 300 could include any suitable type of virtual network.

In some embodiments, the various functions performed by or within the switch 200 are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving traffic through a first interface in a first group of interfaces at a switch, the first group of interfaces associated with a first virtual network and coupled to a switch fabric in the switch;
   determining that the traffic is destined for a destination associated with a second virtual network;

forwarding the traffic from the switch fabric through a second interface in the first group of interfaces to a third interface in a second group of interfaces at the switch, the second group of interfaces associated with the second virtual network and coupled to the switch fabric in the switch, wherein the switch fabric does not transport the traffic from the second interface to the third interface;

filtering the traffic that is received at the third interface in the second group of interfaces, wherein filtering the traffic comprises at least one of: (1) determining whether a traffic type associated with the traffic represents a specified traffic type, and (2) determining whether a port associated with the traffic represents a specified port; and communicating the filtered traffic from the switch fabric towards the destination through a fourth interface in the second group of interfaces;

wherein the specified traffic type comprises Address Resolution Protocol (ARP) broadcast traffic, multicast test traffic, and Network Timing Protocol (NTR) traffic; and wherein the specified port comprises a Transmission Control Protocol (TCP) port or a User Datagram Protocol (UDP) port that is within a specified range of ports and that is associated with unicast traffic.

2. The method of claim 1, wherein the third interface is coupled to the second interface by a cable.

3. The method of claim 2, wherein the cable coupling the second and third interfaces comprises a crossover cable.

4. The method of claim 1, further comprising:
receiving second traffic through one of the interfaces in the first group of interfaces;
determining that the second traffic is destined for a second destination associated with the first virtual network; and
communicating the second traffic towards the second destination without forwarding the second traffic to the second group of interfaces.

5. The method of claim 1, wherein all traffic received at the switch from components in the first virtual network destined for other components in any virtual network is first transmitted away from the switch using only the interfaces in the first group of interfaces.

6. The method of claim 1, wherein:
the first virtual network comprises a first Virtual Local Area Network associated with a Level 2 network level in a process control system; and
the second virtual network comprises a second Virtual Local Area Network associated with a Level 1 network level in the process control system.

7. The method of claim 6, wherein the Level 1 network level comprises one or more controllers configured to control one or more process elements in a processing facility.

8. An apparatus, comprising:
a plurality of interfaces comprising a first group of interfaces associated with a first virtual network and a second group of interfaces associated with a second virtual network;
a switch fabric coupled to the first and second groups of interfaces and configured to transport traffic between the interfaces; and
a controller configured to:
determine that traffic received through a first interface in the first group of interfaces is destined for a destination associated with the second virtual network;
cause the switch fabric to forward the traffic from the switch fabric through a second interface in the first group of interfaces to a third interface in the second group of interfaces, wherein the switch fabric does not transport the traffic from the second interface to the third interface;
filter the traffic that is received at the third interface in the second group of interfaces, wherein the controller is configure to filter the traffic by at least one of: (1) determining whether a traffic type associated with the traffic represents a specified traffic type, and (2) determining whether a off associated with the traffic represents a specified port; and
cause the switch fabric to forward the filtered traffic from the switch fabric to a fourth interface in the second group of interfaces for communication of the filtered traffic towards the destination;

wherein the specified traffic type comprises Address Resolution Protocol (ARP) broadcast traffic, multicast test traffic, and Network Timing Protocol (NTP) traffic; and wherein the specified port comprises a Transmission Control Protocol (TCP) port or a User Datagram Protocol (UDP) port that is within a specified range of ports and that is associated with unicast traffic.

9. The apparatus of claim 8, wherein the third interface is coupled to the second interface by a cable.

10. The apparatus of claim 9, wherein the cable coupling the second and third interfaces comprises a crossover cable.

11. The apparatus of claim 8, wherein the controller is further configured to:
determine that second traffic received through one of the interfaces in the first group of interfaces is destined for a second destination associated with the first virtual network; and
cause the switch fabric to communicate the second waffle towards the second destination without causing the switch fabric to forward the second traffic to the second group of interfaces.

12. The apparatus of claim 8, wherein:
the first virtual network comprises a first Virtual Local Area Network associated with a Level 2 network level in a process control system; and
the second virtual network comprises a second Virtual Local Area Network associated with a Level 1 network level in the process control system.

13. The apparatus of claim 12, wherein the Level 1 network level comprises one or more controllers configured to control one or more process elements in a processing facility.

14. A system, comprising:
a plurality of switches configured to facilitate communication between a plurality of endpoints, at least one of the switches comprising:
a plurality of interfaces comprising a first group of interfaces associated with a first virtual network and a second group of interfaces associated with a second virtual network;
a switch fabric coupled to the first and second groups of interfaces and configured to transport traffic between the interfaces; and
a controller configured to:
determine that traffic received though a first interface in the first group of interfaces is destined for an endpoint associated with the second virtual network;
cause the switch fabric to forward the traffic from the switch fabric though a second interface in the first group of interfaces to a third interface in the second group of interfaces, wherein the switch fabric does not transport the traffic from the second interface to the third interface;

filter the traffic that is received at the third interface in the second group of interfaces, wherein the controller is configured to filter the traffic by at least one of: (1) determining whether a traffic type associated with the traffic represents a specified traffic type, and (2) determining whether a port associated with the traffic represents a specified port; and cause the switch fabric to forward the filtered traffic from the switch fabric to a fourth interface in the second group of interfaces for communication of the filtered waffle towards the endpoint associated with the second virtual network;

wherein the specified traffic type comprises Address Resolution Protocol (ARP) broadcast traffic, muiticast test traffic, and Network Timing Protocol (NTP) traffic; and wherein the specified port comprises a Transmission Control Protocol (TCP) port or a User Datagram Protocol (UDP) port that is within a specified range of ports and that is associated with unicast traffic.

15. The system of claim 14, wherein the third interface is coupled to the second interface by a cable.

16. The system of claim 15, wherein the cable coupling the second and third interfaces comprises a crossover cable.

17. The system of claim 14, wherein:

the first virtual network comprises a first Virtual Local Area Network associated with a Level 2 network level in a process control system; and the second virtual network comprises a second Virtual Local Area Network associated with a Level 1 network level in the process control system, the Level 1 network level comprising one or more controllers configured to control one or more process elements in a processing facility.

* * * * *